United States Patent [19]

Nordin

[11] 4,332,348

[45] Jun. 1, 1982

[54] CURRENCY RECEPTION AND STORAGE DEVICE

[76] Inventor: Richard M. Nordin, 1109 N. Puente St., Brea, Calif. 92621

[21] Appl. No.: 109,656

[22] Filed: Jan. 4, 1980

[51] Int. Cl.³ .............................................. B65G 57/03

[52] U.S. Cl. .................................... 232/43.3; 271/180

[58] Field of Search ........................ 232/43.2, 43.1, 15, 232/16, 5, 6, 7; 109/66, 55; 271/180, 192, 124, 88, 68

[56] References Cited

U.S. PATENT DOCUMENTS 3,655,186 4/1972 Bayha ................................ 271/180
3,667,485 6/1972 Sesko .................................... 232/7
3,977,669 8/1976 Douno ................................ 271/180

FOREIGN PATENT DOCUMENTS 1216887 5/1966 Fed. Rep. of Germany ...... 271/180

*Primary Examiner*—Roy D. Frazier
*Assistant Examiner*—Peter A. Aschenbrenner
*Attorney, Agent, or Firm*—Bruno J. Verbeck; Michael L. Slonecker

[57] ABSTRACT

A device adapted to receive and store all manner of currency, comprising an exterior housing providing security for the currency collected therein, a coin receptacle, a bill receptacle for stacking paper currency in a compact and aligned bundle or stack, means for vertically supporting a received bill upon a minor portion of the supported lateral edge thereof, means for engaging said received bill from an engagement position proximate said supported lateral edge, and means for articulating said bill engagement means whereby to deliver the bill into said bill receptacle.

5 Claims, 5 Drawing Figures

CURRENCY RECEPTION AND STORAGE DEVICE

BACKGROUND OF THE INVENTION

The present invention relates to a currency receptacle device, and more particularly to a device which includes means for receiving and storing, in a compact and aligned bundle, bills of paper currency vertically introduced and supported therein. The concept of forming a bill-stacking mechanism, by using an open-ended enclosure having a pair of support plates partially disposed thereacross and a floating plate urged or biased against the support plates, is well known to the art. For example, Bayha, U.S. Pat. No. 3,655,186 discloses a device including a pair of horizontal support plates and a vertically translatable flat plate ram for delivering a supported bill through the open end into the bill stacking enclosure. See also, Douno, U.S. Pat. No. 3,977,669, which discloses a substantially similar apparatus having horizontal support plates.

In an environment where an individual predominantly handles paper currency, these devices represent substantial savings in labor by eliminating the need to manually sort and stack received bills. However, where the individual further handles large quantities of coins, the problem remains how to collect and store these coins while still realizing the labor savings. A separate slot and receptacle could, of course, be provided for receiving coins; however, such an additional slot and receptacle would require time-consuming separation of the currency, as well as provide two separate points of access for a person intent upon breaching the security of the device.

To provide for the reception and storage of all types of currency, both bills and coins, it is considered advantageous to include a chamber for vertically supporting a bill proximate the open end of the bill-stacking enclosure. In this manner a coin receptacle could then be positioned subjacent to the chamber whereby to collect and store coins falling therethrough.

A problem hitherto associated with a vertical bill receiving chamber resides in the fact that the received bill must be supported upon a lateral edge thereof prior to its introduction into the open-end enclosure. Thus, the prior art has found it necessary to impart rigidity to the bills and then support the rigidised bill upon an entire lateral edge. For example, Okkonen, et al. U.S. Pat. No. 3,917,260 teaches that rigidity may be imparted by including a pair of corrugated rollers which interdigitate so as to vertically straighten and crease a bill prior to introduction into the bill receiving chamber. As will later be appreciated from the discussion which follows, such additional elements complicate the stacking mechanism and further serve to raise costs of production.

In view of the foregoing, it would be understood that there presently exists the need to provide a device of simple and low cost construction which readily accepts, through a single point of access, all manner of paper and metal currency. Such a device must be capable of providing reliable operation over prolonged periods of time and should, in those circumstances where the introduction of currency is intermittent, further be amenable to manual operation. Thus, it is an object of the present invention to provide a device adapted to simultaneously receive and store all manner of currency.

Another object is to provide a device adapted to receive all manner of currency through a single slot.

Yet another object of the present invention is to provide a device including a bill-receiving chamber adapted to vertically receive bills and provide support thereof without first having to impart lateral rigidity to the bills.

A still further object is to provide a device readily adaptable for use in either an automatic or manual mode.

And a still further object of the present invention is to provide a currency receptacle device which is of simple and inexpensive construction and which is capable of providing reliable operation over prolonged periods of time.

The above and other objects will be readily appreciated by reference to the following description of the invention taken in conjunction with the accompanying drawings.

SUMMARY OF THE INVENTION

The above-specified objects and others are achieved by providing an open-end bill-stacking receptacle having a pair of flange members spaced apart across said open-end a distance less than the horizontal dimension of a vertically supported bill. Further included is a floating plate member yieldably urged or biased by conventional means against said flange members. A bill-receiving chamber is disposed proximate the open-end and includes means for vertically supporting received bills upon at least a minor portion of their lateral edges. Subjacent the bill-receiving chamber is a coin receptable adapted to collect coins dropped through said chamber. Finally, an articulable ram assembly is included proximate the side of the bill-stacking chamber opposite said open-end, the ram assembly comprising a plate having a plurality of vertical ribs secured thereto and extended towards said open-end. Said ribs are spaced apart a distance less than the distance between the flange members whereby said ribs may translate therebetween and deliver a bill into the interior of the bill receptacle. To eliminate the need for first rigidising a bill prior to introduction into the bill-receiving chamber, said rib members are of a length sufficient to engage a major portion of the vertical dimension of the received bill from a ram engagement position proximate the supported lateral edge of the bill.

BRIEF DESCRIPTION OF THE PREFERRED EMBODIMENT

Figure 1:
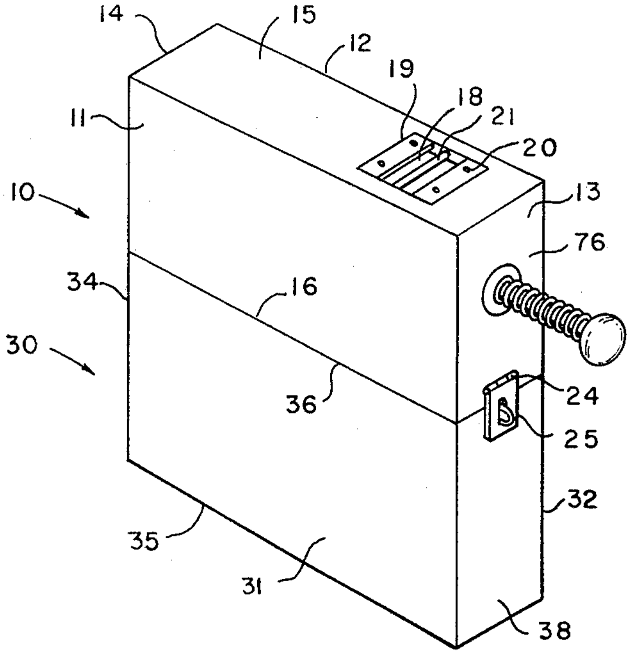
FIG. 1 is a perspective view of the preferred embodiment of the invention.

So that the present invention is more easily understood, reference is now made to the accompanying drawings wherein like reference numerals refer to like parts throughout the several views.

Figure 2:
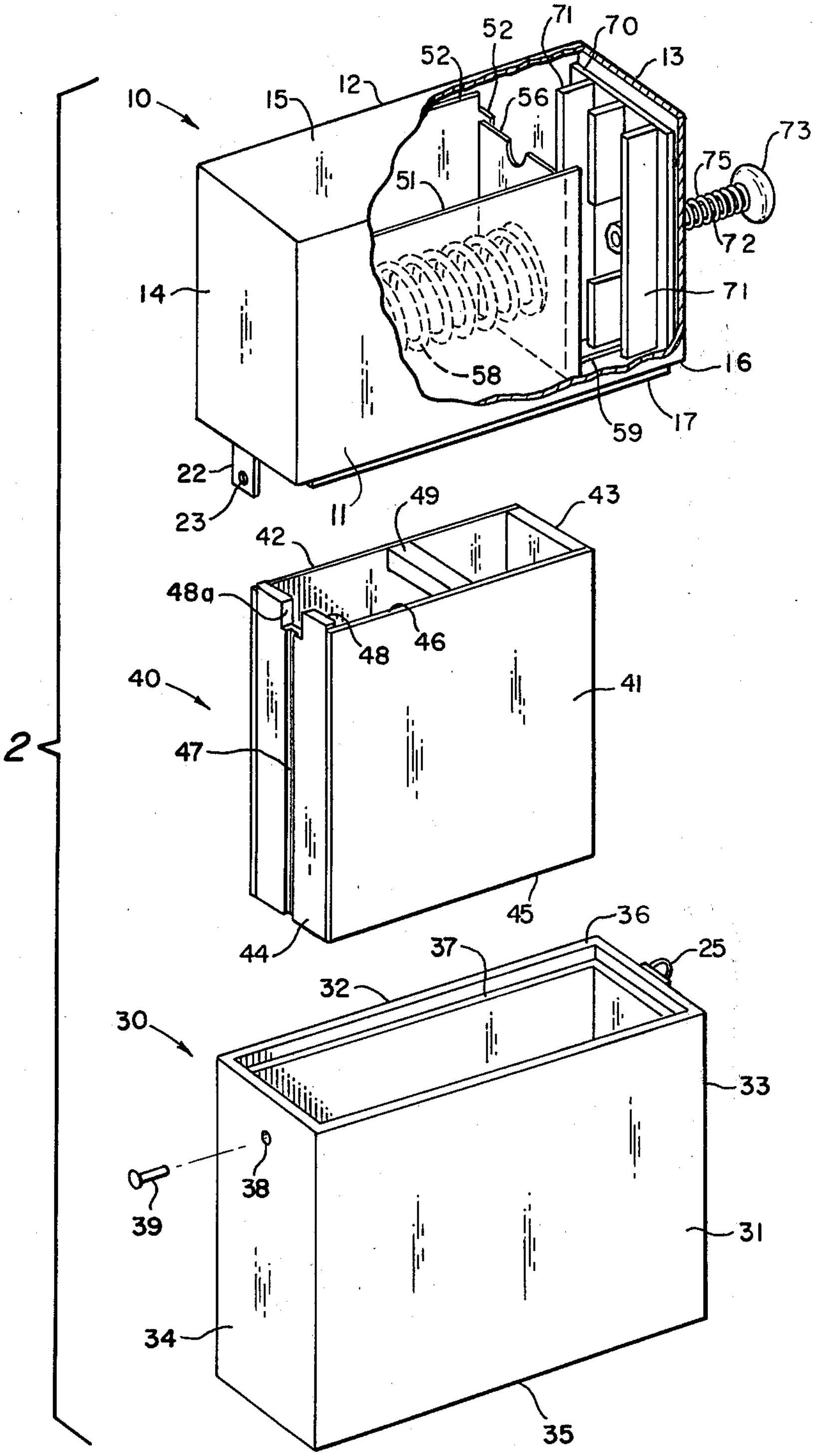
FIG. 2 is an exploded perspective view of the preferred embodiment.

Briefly stated, the preferred embodiment of the invention shown in FIGS. 1 and 2 comprises a first exterior housing 10 conformably accommodated upon a second exterior housing 30 and secured thereto by any conventional means such as a latch 24 and latch hook 25.

As best shown in FIG. 2, housing 10 includes sidewalls 11 and 12, endwalls 13 and 14, a top surface 15, and a bottom having a circumferential edge 16 and raised ridge 17. Secured to the interior surface of endwall 14, and projecting downwardly beyond ridge 17, is a flange 22 or the like having a bore 23.

Referring particularly to FIG. 1, there is formed through the top surface 15 of housing 10 a currency slot 18 adapted to receive bills vertically inserted therethrough. A pair of guide plates 19 are included at opposite ends of slot 18 and secured to housing 10 by screws 20 or the like. A rod or bar 21 is provided across slot 18 and functions to prevent an individual from reaching into housing 10 and disturbing its contents.

With reference to FIG. 2, the second exterior housing 30 includes sidewalls 31 and 32, endwalls 33 and 34, a bottom surface 35, and a top having a circumferential edge 36 and lowered ridge 37.

A bore 38 is provided through endwall 34 which accommodates a pin 39 or the like of sufficient length to engage bore 23 of flange 22 when housing 10 is conformably seated upon housing 30.

In order that the invention may be adapted to receive and store all manner of currency, a removable coin receptacle 40 is provided within the interior void of housing 30 and communicates through housing 10 with slot 18. Thus, a coin dropped through slot 18 will be caused to fall into receptacle 40 and collected therein. Briefly, coin receptacle 40 comprises a substantially box-like enclosure which includes sidewalls 41 and 42, endwalls 43 and 44, a bottom surface 45, and a top edge 46 formed by the edge faces of the respective walls. A handle 49 is secured to the interior surfaces of sidewalls 41 and 42 proximate ridge 46 whereby to facilitate the removal of receptacle 40 from the interior of housing 30. As will be explained hereafter in greater detail, handle 49 also serves as a support member for a bill receptacle 50.

The endwall 44 of receptacle 40 includes a longitudinal groove 47 of sufficient width and depth to permit insertion of receptacle 40 when pin 39 is in place. The upper end-face 48 of endwall 44 may be extended slightly above edge 46 whereby to serve as a stop-block for the bill receptacle 50. A cut-away **48*a* is provided to allow the engagement of flange 22 by pin 39**.

It will be understood that the present invention, as thus far described, provides a convenient and secure receptacle for the storage of coins in loose form. Because most banks possess automated equipment for sorting and stacking loose coins according to denomination, it is considered unnecessary to include within the coin receptacle means for stacking coins, thereby simplifying and reducing the cost of constructing the device. Still further, in certain circumstances it may be unnecessary to provide for the collection of loose coins; therefore, the preferred embodiment may be modified accordingly to provide for only the stacking of paper currency bills in the manner which now follows.

Figure 4:
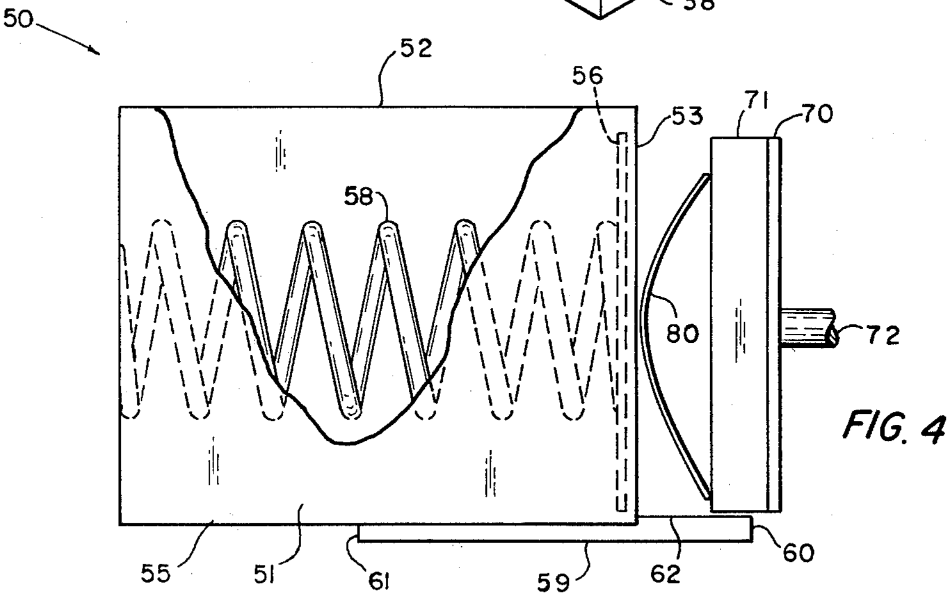
FIG. 4 is a cut-away side view of the bill receptacle and ram assembly.
Figure 3:
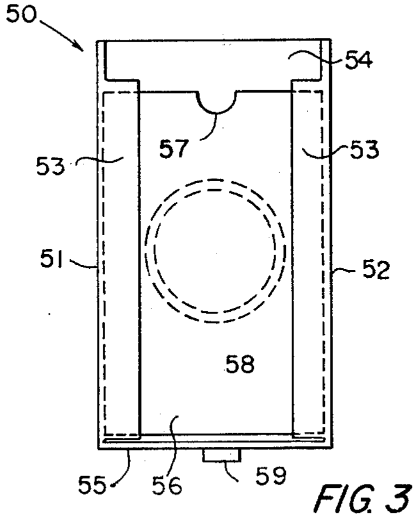
FIG. 3 is an end view of the bill receptacle shown in FIG. 2.
Figure 5:
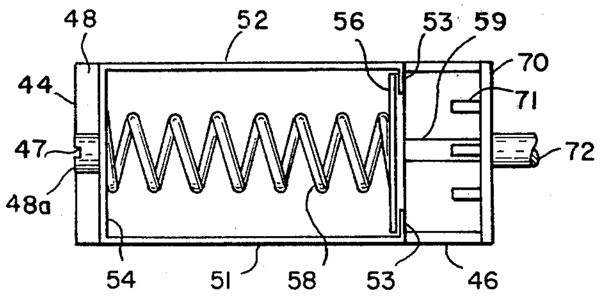
FIG. 5 is an elevational view of the bill receptacle and ram assembly shown in FIG. 4, when the bill receptacle is properly seated upon the coin receptacle shown in FIG. 2.

Referring to FIGS. 3, 4, and 5, the present invention next includes a bill receptacle 50 adapted to receive and stack bills in a compact and aligned bundle. Bill receptacle 50 is seated upon the edge 46 of coin receptacle 40 and disposed within the hollow interior of housing 10. Briefly stated, receptacle 50 is of conventional design having sidewalls 51 and 52, endwall 54, a bottom 55, and a pair of flange members 53 spaced apart across an open end of receptacle 50 a distance less than the horizontal dimension of a bill standing vertically on edge. A floating plate 56 is deployed within the interior of receptacle and urged or biased, by means of a spring 58, block of resilient material (not shown), or the like, against the interiorly facing surfaces of flange members 53. A cuttaway 57 (FIG. 3) is provided proximate the uppermost edge of plate 56 whereby to facilitate the removal therefrom of a stack or array of bills. As shown in FIGS. 3 and 4, receptacle 50 has secured to the bottom 55 thereof a rod or bar 59 extending beyond flange members 53 a distance sufficient to vertically support a received bill 80 upon a minor portion of the lateral edge thereof proximate the open end of receptacle 50. While a minimum width for rod or bar 59 is not prescribed, rod or bar 59 should be sufficiently narrow to avoid interference with coins dropped through slot 18 and falling into coin receptacle 40 (see FIG. 5). In the preferred embodiment of the present invention it is considered advantageous to provide a rod or bar 59 of a length sufficient to abut the end faces 60 and 61 thereof against the interior surface of endwall 43 of receptacle 40 and handle 49, respectively, thereby further restricting fore-/aft movement of receptacle 50 during the stacking operation.

Proximate the open end of receptacle 50 and subjacent slot 18 through housing 10 is included a bill-receiving chamber generally described at its sides by the interior surfaces of sidewalls 11 and 12, at its bottom by rod or bar 59, and at its end opposite receptacle 50 by a ram assembly hereafter described.

The ram assembly shown in FIGS. 2, 4, and 5 beneficially comprises a flat plate 70 disposed across of the width of housing 10 between the interior surfaces of sidewalls 11 and 12. Means for engaging a received bill along a major portion of its vertical dimension from an engagement position proximate the supported lateral edge of the bill are secured to plate 70. Said means must obviously have a width slightly less than the opening between flange members 53, and extend from plate 70 rearwardly a distance sufficient to depress plate 56 whereby to deliver a bill into the interior of receptacle 50. Still further, said means should have a substantially continuous vertical surface whereby to prevent crumpling of a bill as it is introduced into the bill receiving chamber.

In the preferred embodiment of the invention shown in FIG. 2, said bill engagement means is in the form of a plurality of vertically aligned rib members 71 secured to plate 70 and projecting rearwardly therefrom. Of course, other configurations, such as a solid block, could similarly be used and are thus comprehended to be equivalent to the depicted rib members 71.

By constructing a ram in the manner herebefore described, it will be appreciated that the need to include means for first straightening a bill prior to introduction into the receiving chamber is eliminated. As shown in FIG. 4, the engagement of the supported lateral edge of bill 80 by rib members 71 results in the bill being straightened as the ram moves rearwardly across the receiving chamber towards receptacle 50.

Finally, means are provided for articulating the ram from a first home position proximate the bill receiving chamber and past flange members 53, whereby to deliver a bill into receptacle 50. As shown in FIGS. 1 and 2, the preferred embodiment for the ram-articulating means comprises a rod 72 slidably disposed through endwall 13 of housing 10 and secured at one end thereof to plate 70 by a bolt 74 (FIG. 2) or the like. A handle 73 is secured to the opposite end of rod 72, and a spring 75 is surmounted upon rod 72 between endwall 13 and handle 73. In this manner spring 75 is caused to bias the ram assembly to said first home position. Onviously, other arrangements for the ram articulating means are possible, these including both electrically and manually operable mechanisms.

Based upon the foregoing it will be understood that the present invention satisfies the herebefore stated objects and others by working as follows: A bill is first introduced through slot 18 into the bill receiving chamber, whereupon the lowermost lateral edge of the bill is caused to be supported upon rod or bar 59. During the process of introducing the bill into the receiving chamber, the vertical alignment of rib members 71 prevents the bill from crumpling and assists in vertically supporting the bill. At such time as the bill is to be delivered into the bill stacking receptacle 50, the ram assembly is moved rearwardly whereby to engage a major portion of the vertical dimension of the received bill from a point of engagement proximate the supported lateral edge. Thus, as the ram travels across the receiving chamber towards receptacle 50, the bill is caused to be straightened and is substantially flat when delivered into receptacle 50. By providing a rod or bar 59 which occupies a minor portion of the bottom of the bill receiving chamber, coins or the like introduced through slot 18 readily pass through said chamber and fall into the coin receptacle 40.

While a preferred embodiment of the present invention has been described herein it is to be appreciated that various changes, modifications, and rearrangements can be made without departing from the essence and scope of the invention as defined in the appended claims. Thus, it is intended that the specification and claims not be read in a limiting sense and that obvious variants thereof are considered to be within the scope of the invention.

What is claimed is:

1. A device for collecting currency or the like, comprising:

(a) an exterior housing having a slot adapted to receive currency;

(b) a bill receptacle, disposed within the interior of said housing, having an opening at one end thereof;

(c) at least two opposed flange members secured to said open end spaced apart a distance less than the horizontal dimension of a vertically supported bill;

(d) a first plate member disposed within the interior of said bill receptacle;

(e) means for biasing said first plate member against said flange members;

(f) a bill receiving chamber proximate said open end adapted to receive a bill from the slot through said exterior housing;

(g) means for supporting received bills upon at least a minor portion of a lateral edge thereof within said bill receiving chamber;

(h) means for engaging a major portion of the vertical dimension of a received bill from an engagement position proximate the supported lateral edge of said bill;

(i) means for articulating said bill-engagement means from a first home position proximate one side of said bill-receiving chamber opposite said open end across said chamber and through said open end past said flange members and back into said home position whereby to carry a bill from said bill-receiving chamber into said bill receptacle; and (j) a coin token receptacle subjacent said bill support means and communicating through said bill receiving chamber with the slot of said exterior housing.

2. A device as defined in claim 1, wherein said exterior housing comprises a first housing adapted to receive said bill receptacle, a second housing adapted to receive said coin or token receptacle, and means for securing said first housing to said second housing.

3. A device as defined in claims 1 or 3, further comprising means for biasing said bill engagement means to said first home position.

4. A device as defined in claim 4 wherein said bill engagement means comprises a plurality of vertical rib members directed towards said bill-receiving chamber, said rib members being spaced apart a distance less than the distance between said flange members.

5. A device as defined in claim 1, wherein said first platebiasing means comprises a spring or block of resilient material disposed within the interior of said bill receptacle.

* * * * *

UNITED STATES PATENT AND TRADEMARK OFFICE

CERTIFICATE OF CORRECTION

PATENT NO. : 4,332,348

DATED : June 1, 1982

INVENTOR(S) : Richard M. Nordin

It is certified that error appears in the above-identified patent and that said Letters Patent are hereby corrected as shown below:

In Claim 3, line 1, after "claims 1 or" delete "3" and substitute --2--.

In Claim 4, line 1, after "claim" delete "4" and substitute --3--.

Signed and Sealed this

*Tenth* Day of *August 1982*

[SEAL]

*Attest:*

GERALD J. MOSSINGHOFF

*Attesting Officer* *Commissioner of Patents and Trademarks*